(12) United States Patent
Shimizu

(10) Patent No.: US 10,428,890 B2
(45) Date of Patent: Oct. 1, 2019

(54) VIBRATION-DAMPING DEVICE

(71) Applicant: BRIDGESTONE CORPORATION, Tokyo (JP)

(72) Inventor: Hiroaki Shimizu, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 15/576,017

(22) PCT Filed: Mar. 9, 2016

(86) PCT No.: PCT/JP2016/057407
§ 371 (c)(1),
(2) Date: Nov. 21, 2017

(87) PCT Pub. No.: WO2016/189925
PCT Pub. Date: Dec. 1, 2016

(65) Prior Publication Data
US 2018/0149226 A1    May 31, 2018

(30) Foreign Application Priority Data

May 28, 2015   (JP) .................................. 2015-108632

(51) Int. Cl.
*F16F 1/38*      (2006.01)
*F16F 15/08*     (2006.01)
*B60K 5/12*      (2006.01)

(52) U.S. Cl.
CPC .............. *F16F 1/38* (2013.01); *F16F 1/3828* (2013.01); *F16F 1/3842* (2013.01);
(Continued)

(58) Field of Classification Search
CPC .......... F16F 1/38; F16F 1/3828; F16F 1/3842; F16F 1/3863; F16F 15/08
See application file for complete search history.

(56) References Cited

U.S. PATENT DOCUMENTS

2011/0291377 A1* 12/2011 Kato .................. B60G 21/0551
                                                                   280/124.107
2014/0103588 A1*  4/2014 Firla ....................... F16F 1/373
                                                                   267/292
2015/0129742 A1*  5/2015 Okanaka .............. B60K 5/1208
                                                                   248/634

FOREIGN PATENT DOCUMENTS

JP          2009041760 A     2/2009
JP          2009-196512 A    9/2009
(Continued)

OTHER PUBLICATIONS

Communication dated May 23, 2018, from the European Patent Office in counterpart European Application No. 16799634.7.
(Continued)

*Primary Examiner* — Vishal R Sahni
(74) *Attorney, Agent, or Firm* — Sughrue Mion, PLLC

(57) ABSTRACT

A vibration-damping device (1) of the present invention includes a tubular first attachment member (11), a second attachment member (12) that is attached to any one of a vibration generating portion and a vibration receiving portion, an elastic body (13) that connects the first attachment member and the second attachment member with each other, and a bracket (B) that is connected to the remaining one of the vibration generating portion and the vibration receiving portion and is press-fitted into the first attachment member. The second attachment member includes a stopper wall portion (14) which surrounds the first attachment member from radially outside. A penetration hole (11*b*) which is open toward the stopper wall portion is formed in the first attachment member, and a stopper elastic body (19) covering the penetration hole is installed on an inner circumferential surface of the first attachment member. The stopper elastic body is elastically deformed by the bracket and
(Continued)

protrudes to an outer circumferential surface side of the first attachment member through the penetration hole.

1 Claim, 1 Drawing Sheet

(52) U.S. Cl.
CPC ............ *F16F 1/3863* (2013.01); *F16F 15/08* (2013.01); *B60K 5/1208* (2013.01)

(56) References Cited

FOREIGN PATENT DOCUMENTS

| | | |
|---|---|---|
| JP | 2014-066325 A | 4/2014 |
| JP | 2015-096754 A | 5/2015 |
| WO | 2014/050761 A1 | 4/2014 |

OTHER PUBLICATIONS

International Search Report for PCT/JP2016/057407 dated Apr. 5, 2017 [PCT/ISA/210].
Communication dated Oct. 26, 2018, from State Intellectual Property Office of the P.R.C. in counterpart application No. 2016800299788.

* cited by examiner

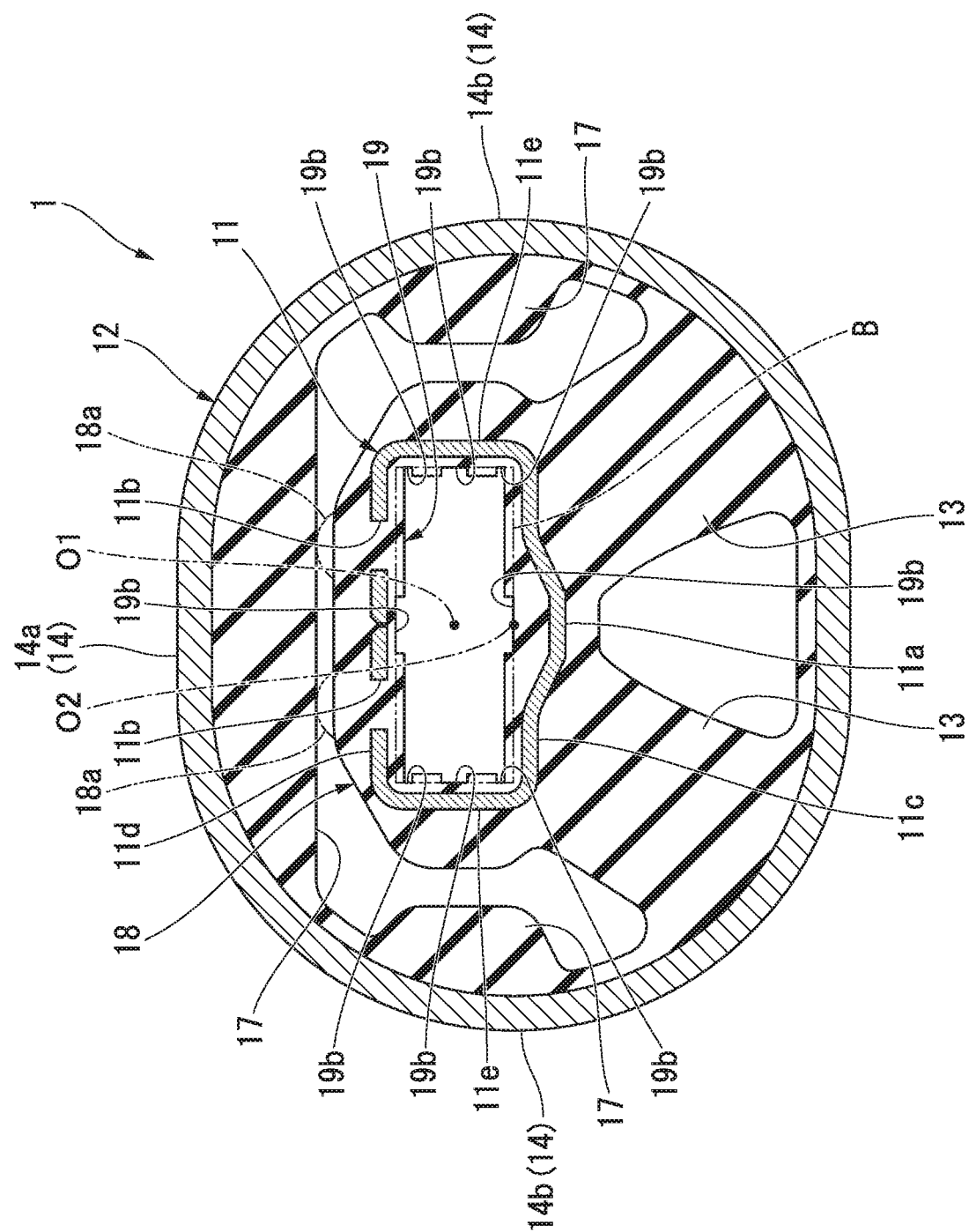

VIBRATION-DAMPING DEVICE

TECHNICAL FIELD

The present invention relates to a vibration-damping device.

Priority is claimed on Japanese Patent Application No. 2015-108632, filed on May 28, 2015, the content of which is incorporated herein by reference.

BACKGROUND ART

In the related art, there is a known configuration of a vibration-damping device including a tubular first attachment member, a second attachment member that is attached to any one of a vibration generating portion and a vibration receiving portion, an elastic body that connects the first attachment member and the second attachment member with each other, and a bracket that is connected to the remaining one of the vibration generating portion and the vibration receiving portion and is press-fitted into the first attachment member. The second attachment member includes a stopper wall portion which surrounds the first attachment member from radially outside. A stopper elastic body is installed in a part facing the stopper wall portion on an outer circumferential surface of the first attachment member.

As vibration-damping devices of such a type, the following two configurations are known.

In the first configuration, for example, as disclosed in Patent Document 1, a second attachment member includes a stopper metal part (76) which has a pair of leg wall portions (82) and a ceiling portion (80) connecting upper ends of the pair of leg wall portions (82) with each other, a fitting tube metal part (74) which is bonded in a state where an outer circumferential surface is inscribed in the pair of leg wall portions (82), a tubular second attachment metal part (14) which is fitted in the fitting tube metal part (74) and in which an elastic body is connected to an inner circumferential surface. A stopper wall portion is configured to include the ceiling portion (80) and connection parts of the leg wall portions (82) with respect to the ceiling portion (80).

In the second configuration, a second attachment member is formed in a tubular shape surrounding a first attachment member throughout the entire circumference from radially outside, and a part thereof in a circumferential direction serves as the stopper wall portion.

CITATION LIST

Patent Document

[Patent Document 1] Japanese Unexamined Patent Application, First Publication No. 2009-196512

SUMMARY OF INVENTION

Technical Problem

However, in the vibration-damping devices in the related art, in order to cause a clearance between a stopper wall portion and a stopper elastic body to be narrow or absent, for example, there is a need to reduce the thickness of a part forming the clearance in a vulcanization molding die or to plasticize a second attachment member such that the stopper wall portion approaches the stopper elastic body. Therefore, it is difficult to manufacture a vibration-damping device in which the clearance is narrow or absent.

The present invention has been made in consideration of the foregoing circumstances and an object thereof is to provide a vibration-damping device which can be easily formed and in which a clearance between a stopper elastic body of a first attachment member and a stopper wall portion of a second attachment member is narrow or absent.

Solution to Problem

In order to solve the problem and to achieve the object, according to the present invention, there is provided a vibration-damping device including a tubular first attachment member, a second attachment member that is attached to any one of a vibration generating portion and a vibration receiving portion, an elastic body that connects the first attachment member and the second attachment member with each other, and a bracket that is connected to the remaining one of the vibration generating portion and the vibration receiving portion and is press-fitted into the first attachment member. The second attachment member includes a stopper wall portion which surrounds the first attachment member from radially outside. A penetration hole which is open toward the stopper wall portion is formed in the first attachment member, and a stopper elastic body covering the penetration hole is installed on an inner circumferential surface of the first attachment member. The stopper elastic body is elastically deformed by the bracket and protrudes to an outer circumferential surface side of the first attachment member through the penetration hole.

According to this invention, when the bracket is press-fitted into the first attachment member, the stopper elastic body is elastically deformed, protrudes to the outer circumferential surface side of the first attachment member through the penetration hole, and comes into contact with or comes close to the stopper wall portion side of the second attachment member. When the stopper wall portion and the first attachment member relatively move to approach each other in response to an input of a vibration, the stopper elastic body protruding through the penetration hole to the outer circumferential surface side of the first attachment member is pressed to the stopper wall portion side.

Therefore, there is no need to reduce the thickness of a part forming a clearance in a vulcanization molding die or to plasticize the second attachment member such that the stopper wall portion approaches the stopper elastic body, for example, in order to cause the clearance between the stopper wall portion and the stopper elastic body to be narrow or absent. That is, when the bracket is press-fitted into the first attachment member, the bracket can be sufficiently press-fitted by increasing the thickness of the stopper elastic body and causing the stopper elastic body to be significantly and elastically deformed. Therefore, it is possible to prevent deterioration of the durability of the vulcanization molding die and damage to the second attachment member, and it is possible to easily and accurately form a vibration-damping device in which the clearance is narrow or absent.

Advantageous Effects of Invention

According to this invention, it is possible to easily form a vibration-damping device in which a clearance between the stopper elastic body of the first attachment member and the stopper wall portion of the second attachment member is narrow or absent.

BRIEF DESCRIPTION OF DRAWINGS

FIG. 1 is a cross-sectional view of a vibration-damping device shown as an embodiment according to the present invention.

DESCRIPTION OF EMBODIMENT

Hereinafter, an embodiment of a vibration-damping device according to the present invention will be described with reference to FIG. 1.

A vibration-damping device 1 includes a tubular first attachment member 11, a second attachment member 12 that is attached to any one of a vibration generating portion and a vibration receiving portion, elastic bodies 13 that connect the first attachment member 11 and the second attachment member 12 with each other, and a bracket B that is connected to the remaining one of the vibration generating portion and the vibration receiving portion and is press-fitted into the first attachment member 11.

For example, in a case where the vibration-damping device 1 is mounted in a vehicle, the first attachment member 11 is connected to an engine (vibration generating portion) via the bracket B. On the other hand, the second attachment member 12 is connected to a vehicle body (vibration receiving portion).

The first attachment member 11 is formed in a polygon shape in a planar view seen in a direction of a central axis line O1 thereof. In the shown example, the first attachment member 11 is formed in a rectangular shape in a planar view.

The second attachment member 12 is formed in a tubular shape surrounding the first attachment member 11 throughout the entire circumference from radially outside. In the shown example, the second attachment member 12 is formed in an elliptical shape in a planar view seen in a direction of a central axis line O2 thereof.

The central axis lines O1 and O2 of the first attachment member 11 and the second attachment member 12 extend in the same direction. The first attachment member 11 and the second attachment member 12 are installed such that longitudinal directions thereof coincide with each other in a planar view and transverse directions thereof coincide with each other. Central portions of the first attachment member 11 and the second attachment member 12 in the longitudinal direction coincide with each other. The central portions of the first attachment member 11 and the second attachment member 12 in the transverse direction are offset.

Hereinafter, in the transverse direction, a side having a large gap between an outer circumferential surface of the first attachment member 11 and an inner circumferential surface of the second attachment member 12 will be referred to as a lower side, and a side having a small gap therebetween will be referred to as an upper side.

The central portions of the first attachment member 11 and the second attachment member 12 in the longitudinal direction may be offset, or the central portions of the first attachment member 11 and the second attachment member 12 in the transverse direction may coincide with each other.

The elastic bodies 13 are installed in a lower space having a large gap in the transverse direction, in an annular space between the outer circumferential surface of the first attachment member 11 and the inner circumferential surface of the second attachment member 12. The elastic bodies 13 form a pair and are installed in the longitudinal direction. In addition, in the first attachment member 11, the elastic bodies 13 are installed throughout the entire region on the outer circumferential surface of a lower long-side part 11c which has a wide gap in the transverse direction with respect to the inner circumferential surface of the second attachment member 12 and is positioned on the lower side, out of two long-side parts 11c and 11d configuring a rectangular shape in a planar view. The gap between the pair of elastic bodies 13 in the longitudinal direction is gradually widened from the upper side toward the lower side.

Here, the second attachment member 12 includes a stopper wall portion 14 which surrounds the first attachment member 11 from radially outside. The stopper wall portion 14 is a part of the second attachment member 12 in the circumferential direction.

In the present embodiment, in the second attachment member 12, the stopper wall portion 14 is constituted of an upper part (hereinafter, will be referred to as an upper stopper wall) 14a on a side opposite to the lower part in which the elastic bodies 13 is installed in the part facing the first attachment member 11 in the transverse direction, and parts (hereinafter, will be referred to as side stopper walls) 14b facing each other in both directions in the longitudinal direction of the first attachment member 11.

An outer stopper elastic body 17 is installed on each of the inner circumferential surfaces of the upper stopper wall 14a and a pair of side stopper walls 14b. The outer stopper elastic body 17 installed on the upper stopper wall 14a is formed in a trapezoidal shape in which the length in the longitudinal direction increases gradually inward in the transverse direction and the lower surface facing the first attachment member 11 side is a flat surface extending straight in both directions in the longitudinal direction and the directions of the central axis lines O1 and O2. The outer stopper elastic bodies 17 installed on the side stopper walls 14b are formed in trapezoidal shapes in which the length in the transverse direction decreases gradually inward in the longitudinal direction.

In the shown example, in the lower long-side part 11c of the first attachment member 11, a swelling portion 11a which swells to the lower side is formed in a central portion in the longitudinal direction. The swelling portion 11a does not have to be formed in the first attachment member 11.

In addition, the first attachment member 11 is formed in a tubular shape in which a sheet of rectangular plate body is bent and both end edges thereof butt each other, thereby forming a rectangular shape in a planar view. Both the end edges are positioned at a central portion of the upper long-side part 11d in the longitudinal direction having a narrow gap in the transverse direction with respect to the inner circumferential surface of the second attachment member 12 and being positioned on the upper side, out of the two long-side parts 11c and 11d in the first attachment member 11. The outer circumferential surface of the central portion of the upper long-side part 11d in the longitudinal direction in the first attachment member 11 extends gradually downward from the outside to the inside in the longitudinal direction, and the inner circumferential surface thereof extends straight in the longitudinal direction.

The first attachment member 11 may be a tubular body which seamlessly and continuously extends throughout the entire circumference thereof.

In the present embodiment, penetration holes 11b which are open toward the stopper wall portion 14 are formed in the first attachment member 11. Stopper elastic bodies 19 covering the penetration holes 11b are installed on the inner circumferential surface of the first attachment member 11. The stopper elastic bodies 19 are elastically deformed by the bracket B and protrude to the outer circumferential surface side of the first attachment member 11 through the penetration holes 11b.

A plurality of penetration holes 11b are formed in the upper long-side part 11d of the first attachment member 11 while having a gap in the longitudinal direction. In the shown example, the penetration holes 11b are separately formed on both sides while both the end edges are interposed in the longitudinal direction in the upper long-side part 11d of the first attachment member 11.

The penetration holes 11b are long holes elongated in the directions of the central axis lines O1 and O2. The penetration holes 11b are formed in the central portions of the first attachment member 11 in the directions of the central axis lines O1 and O2.

One penetration hole 11b may be formed in the first attachment member 11, or the penetration holes 11b may be formed in short-side parts 11e configuring a rectangular shape in a planar view in the first attachment member 11.

The stopper elastic bodies 19 are installed throughout the entire region on the inner circumferential surface of the first attachment member 11. In the stopper elastic bodies 19, recess portions 19b are formed in parts each positioned at a part in which no penetration hole 11b is formed on the inner circumferential surface of the first attachment member 11.

In the shown example, in the stopper elastic bodies 19, the recess portions 19b extending throughout the entire length in the directions of the central axis lines O1 and O2 are formed in the central portions of the parts in the longitudinal direction installed in the two long-side parts 11c and 11d in the first attachment member 11. In addition, in the stopper elastic bodies 19, a plurality of recess portions 19b are formed in the parts in the transverse direction installed in two short-side parts 11e in the first attachment member 11. The depths of all the recess portions 19b formed in the stopper elastic bodies 19 are the same as each other.

In the bracket B, the upper surface which is press-fitted into at least the first attachment member 11 and is oriented to the penetration holes 11b side, that is, upward is a flat surface extending straight in the longitudinal direction and both directions of the directions of the central axis lines O1 and O2. In addition, in a state where the bracket B is press-fitted into the first attachment member 11, the stopper elastic bodies 19 are elastically deformed so that the recess portions 19b are squashed, and the inner circumferential surfaces of the stopper elastic bodies 19 are in shapes along the outer shape of the part of the bracket B press-fitted into the first attachment member 11, as indicated with the two-dot chained line in FIG. 1.

Here, among the plurality of side parts 11c to 11e configuring a polygon shape in a planar view in the first attachment member 11, in the upper long-side part 11d in which the penetration holes 11b are formed, the stopper elastic bodies 19 are increased in thickness at parts covering the penetration holes 11b compared to the parts covering a part in which no penetration hole 11b is formed.

In addition, the stopper elastic bodies 19 are increased in thickness toward the far side from the near side in the press-fit direction in which the bracket B is press-fitted into the first attachment member 11.

Here, covering elastic bodies 18 are installed on the outer circumferential surface of the first attachment member 11 throughout the entire region. The covering elastic bodies 18, the stopper elastic bodies 19, the elastic bodies 13, and the outer stopper elastic bodies 17 are integrally formed. The covering elastic bodies 18, the stopper elastic bodies 19, the elastic bodies 13, and the outer stopper elastic bodies 17 are formed by vulcanizing an unvulcanized rubber compact obtained through injection molding in a state where the first attachment member 11 and the second attachment member 12 are inserted into a cavity of a vulcanization molding die. The covering elastic bodies 18 and the outer stopper elastic bodies 17 do not have to be provided.

As described above, according to the vibration-damping device 1 of the present embodiment, when the bracket B is press-fitted into the first attachment member 11, as indicated with the two-dot chained line in FIG. 1, the stopper elastic bodies 19 are elastically deformed and protrude to the outer circumferential surface side of the first attachment member 11 through the penetration holes 11b. Therefore, among the covering elastic bodies 18, parts (hereinafter, will be referred to as protrusion parts) 18a covering the penetration holes 11b from the outer circumferential surface side of the first attachment member 11 protrude, thereby coming into contact with or coming close to the outer stopper elastic bodies 17 installed in the upper stopper wall portion 14a. When the outer stopper elastic bodies 17 and the first attachment member 11 installed in the upper stopper wall portion 14a relatively move to approach each other in response to an input of a vibration, the stopper elastic bodies 19 protruding through the penetration holes 11b to the outer circumferential surface side of the first attachment member 11 are pressed to the outer stopper elastic bodies 17 installed in the upper stopper wall portion 14a, via the protrusion parts 18a of the covering elastic bodies 18.

Therefore, in order to cause a clearance between the outer stopper elastic bodies 17 installed in the upper stopper wall portion 14a and the protrusion parts 18a of the covering elastic bodies 18 to be narrow or absent, the following configuration can be adopted. For example, there is no need to reduce the thickness of a part forming the clearance in the vulcanization molding die or to plasticize the second attachment member 12 such that the upper stopper wall portion 14a approaches the covering elastic bodies 18. When the bracket B is press-fitted into the first attachment member 11, the bracket B can be sufficiently press-fitted by increasing the thickness of the stopper elastic bodies 19 and causing the stopper elastic bodies 19 to be significantly and elastically deformed. That is, it is possible to prevent deterioration of the durability of the vulcanization molding die, damage to the second attachment member 12, and peeling of the outer stopper elastic bodies 17 from the upper stopper wall portion 14a, and it is possible to easily and accurately form a vibration-damping device 1 in which the clearance is narrow or absent.

In addition, since the recess portions 19b are formed in the stopper elastic bodies 19, when the bracket B is press-fitted into the first attachment member 11, the stopper elastic bodies 19 are elastically deformed so that the recess portions 19b are squashed. Therefore, a pressing force required when the bracket B is press-fitted into the first attachment member 11 can be prevented from excessively increasing. Furthermore, in the stopper elastic bodies 19, the recess portions 19b are formed in the parts each positioned at a part in which no penetration hole 11b is formed on the inner circumferential surface of the first attachment member 11. Therefore, it is possible to prevent the stopper elastic bodies 19 from being unlikely to protrude to the outer circumferential surface side of the first attachment member 11 through the penetration holes 11b due to the recess portions 19b formed in the stopper elastic bodies 19, when the bracket B is press-fitted into the first attachment member 11.

The technical scope of the present invention is not limited to the embodiment described above, and various changes can be added within a range not departing from the gist of the present invention.

For example, the embodiment has shown a configuration in which the first attachment member 11 is formed in a polygon shape in a planar view seen in the axial direction thereof. However, the embodiment is not limited thereto. The shape may be suitably changed. For example, the first attachment member 11 may be formed in a circular shape.

In addition, the embodiment has shown a configuration in which the second attachment member 12 is formed in a tubular shape surrounding the first attachment member 11 throughout the entire circumference from radially outside. However, the embodiment is not limited thereto. For example, as disclosed in Patent Document 1, the embodiment may have a configuration in which a second attachment member includes a stopper metal part which has a pair of leg wall portions and a ceiling portion connecting upper ends of the pair of leg wall portions with each other, a fitting tube metal part which is bonded in a state where an outer circumferential surface is inscribed in the pair of leg wall portions, a tubular second attachment metal part which is fitted in the fitting tube metal part and in which an elastic body is connected to an inner circumferential surface. Moreover, a stopper wall portion includes the ceiling portion and connection parts of the leg wall portions with respect to the ceiling portion.

In addition, the embodiment has shown a configuration in which the covering elastic bodies 18 are installed on the outer circumferential surface of the first attachment member 11, and when the outer stopper elastic bodies 17 and the first attachment member 11 installed in the upper stopper wall portion 14a relatively move to approach each other in response to an input of a vibration, the stopper elastic bodies 19 protruding to the outer circumferential surface side of the first attachment member 11 through the penetration holes 11b are pressed to the outer stopper elastic bodies 17 installed in the upper stopper wall portion 14a via the protrusion parts 18a of the covering elastic bodies 18. However, in place thereof, for example, the embodiment may adopt a configuration in which the stopper elastic bodies 19 protruding to the outer circumferential surface side of the first attachment member 11 through the penetration holes 11b are directly pressed to the outer stopper elastic bodies 17 installed in the upper stopper wall portion 14a, without installing the covering elastic bodies 18.

In addition, the present invention is not limited to an engine mount of a vehicle and can be applied to vibration-damping devices other than the engine mount. For example, the present invention may be applied to a mount for a generator loaded in a construction machine or may be applied to mounts for a machine installed in a factory or the like.

Furthermore, within a range not departing from the gist of the present invention, the constituent elements in the embodiment described above can be suitably replaced by known constituent elements. In addition, the above-described modification examples may be suitably combined.

INDUSTRIAL APPLICABILITY

According to this invention, it is possible to easily form a vibration-damping device in which a clearance between a stopper elastic body of a first attachment member and a stopper wall portion of a second attachment member is narrow or absent.

REFERENCE SIGNS LIST

1 VIBRATION-DAMPING DEVICE
11 FIRST ATTACHMENT MEMBER
11b PENETRATION HOLE
12 SECOND ATTACHMENT MEMBER
13 ELASTIC BODY
14 STOPPER WALL PORTION
17 OUTER STOPPER ELASTIC BODY
19 STOPPER ELASTIC BODY
19b RECESS PORTION
B BRACKET

What is claimed is:
1. A vibration-damping device comprising:
a tubular first attachment member;
a second attachment member that is attached to any one of a vibration generating portion and a vibration receiving portion;
an elastic body that connects the first attachment member and the second attachment member with each other; and
a bracket that is connected to the remaining one of the vibration generating portion and the vibration receiving portion and is press-fitted into the first attachment member,
wherein the second attachment member includes a stopper wall portion which surrounds the first attachment member from radially outside,
wherein an outer stopper elastic body is installed on an inner circumferential surface of the stopper wall portion,
wherein a penetration hole which is open toward the stopper wall portion is formed in the first attachment member, and a stopper elastic body covering the penetration hole is installed on an inner circumferential surface of the first attachment member,
wherein, in the stopper elastic body, a recess portion is formed in a part positioned at a part in which no penetration hole is formed on the inner circumferential surface of the first attachment member,
wherein a covering elastic body integrally formed with the stopper elastic body is installed on an outer circumferential surface of the first attachment member,
wherein a portion of the covering elastic body covering the penetration hole from an outer circumferential surface side of the first attachment member protrudes and comes into contact with or comes close to the outer stopper elastic body by the stopper elastic body being elastically deformed by the bracket and protruding to the outer circumferential surface side of the first attachment member through the penetration hole,
wherein the portion of the covering elastic body covering the penetration hole from the outer circumferential surface side of the first attachment member protrudes towards the stopper wall portion and comes into contact with or comes close to the outer stopper elastic body when the bracket is press-fitted into the first attachment member, and
wherein the portion of the covering elastic body includes at least one protruding part that extends from a surface of the covering elastic body situated directly opposite the outer stopper elastic body in a direction toward the outer stopper elastic body.

* * * * *